United States Patent Office 3,205,284
Patented Sept. 7, 1965

3,205,284
POLYMERIC POLYESTERS TERMINATED WITH ORGANIC CARBAMATE GROUPS
Charles R. McCulloch, Sacramento, Calif., assignor to The B.F. Goodrich Company, New York, N.Y., a corporation of New York
No Drawing. Filed July 20, 1960, Ser. No. 43,997
18 Claims. (Cl. 260—858)

This invention relates to novel compounds useful as plasticizers for polymeric materials. More specifically, the present invention relates to new plasticizers for polyurethanes, to methods for making the same and to polymeric compositions containing said plasticizers.

Polyesterurethanes (more properly termed polyester-carbamates where the glycol used in making the ester component contains more than 2 carbon atoms) are now well known materials. They may be made by the reaction of polyisocyanates, usually diisocyanates, with polyesters, said polyesters being obtained by the reaction of polyols and polybasic acids, for example, glycols and dibasic acids or by transesterification and other reactions. They, also, may be obtained by the reaction of alkyd resins having bifunctional groups and polyisocyanates. The molecular weights range from about 10,000 to 40,000 or more.

The reaction mixture forming the polyesters may contain minor amounts of amino alcohols, diamines and the like. Moreover, depending on the equivalents of OH and COOH group containing reactants charged, the resulting polyesters may contain regulated ratios of terminal OH or COOH groups. In addition, depending on the type of glycol, dibasic acid and other component employed and on the time of reaction, the molecular weight of the polyesters may be varied somewhat. Thus, the polyesters employed, although containing a predominant amount of ester groups and terminal carboxyl and/or hydroxyl groups, will vary as to their chemical and physical properties.

Furthermore, the amount and type of polyisocyanate employed will also vary the properties of the polyesterurethane ultimately obtained.

The reaction mixture may also be supplemented with glycols, polyols, amines, amino alcohols, water and the like in minor amounts so that the properties of the resulting polyesterurethanes are further modified. Likewise, additional polyisocyanate may be added to the polyesterurethane to cross-link the polymer and further change its properties.

The polyester urethanes exhibit many different properties. For example, some are hard, others are soft; some are rubbery and gum-like while others are resinous. Some are solid while others are cellular (foams) or liquids (castable). They may or may not be cross-linked. Many of the desired properties in a polyurethane can be obtained by careful examination and selection of the right polymers, monomers, amounts, reaction conditions and the like. However, this requires considerable effort and experimentation, and it is not always possible to modify further a given polymer or its reaction conditions to obtain a desired change without adversely affecting the good features of the polyurethane. Moreover, when considering the many applications of polyurethanes and the needs for a particular application, it is not always possible to find a particular polyurethane which will perform satisfactorily in a number of different situations. In such cases, a number of different polyurethanes must be made, requiring a large inventory of materials and a considerable amount of extra labor.

Take, for example, the case of a hard, tough thermoplastic polyesterurethane of polytetramethylene adipate, butanediol and diphenylmethane diisocyanate or of polyneopentylene isophthalate, neopentyl glycol and phenylene diisocyanate. These polyurethanes have many excellent properties adapting them for such uses as electrical wire jacketing, abrasion resistant coating for cloth and other substrates and the like. However, attempts to soften the polymers so that they can be used for many other purposes, or so that they can be extruded or processed more easily, by varying the ingredients or the amounts of ingredients forming the polyurethanes, or by adding hydrocarbon softening or processing oils, or conventional ester plasticizers such as dioctyl phthalate and the like, result in unsatisfactory physical properties in the product.

It would be highly desirable to overcome the difficulties alluded to above and to provide a plasticizer or other material for polyurethanes which would be useful in modifying the properties of the polyurethane without having to change the chemical structure of the polyurethane itself; and, accordingly, it is a primary object of this invention to provide a plasticizer useful in modifying a polyurethane so as to obtain the desired physical properties.

It is still another object of this invention to provide a method for making plasticizers suitable for modifying polyurethanes to obtain the requisite physical characteristics.

A further object is to provide a method for making plasticizers which will reduce the hardness and dynamic extrusion characteristics of polyesterurethanes.

A still further object is to provide plasticized polyurethanes, such as plastized polyester urethanes, modified as to their physical properties, particularly as to their softness and extrudability and exhibiting good stress-strain properties.

These and other objects and advantages of the present invention will become more apparent to those skilled in the art from the following detailed description and examples.

According to the present invention, it has now been discovered that novel organic carbamate terminated polyesters can be used as plasticizers for polyurethanes. These materials will serve to modify the properties of a given polyurethane so that it can be used for a variety of purposes thereby avoiding the necessity of providing a number of different polyurethanes based on the same general ingredients. Hard, tough polyesterurethanes have been modified by the plasticizers of the present invention to produce novel products which exhibit greater softness and improved extrudability and in many cases, greatly improved tensile strength, 300% modulus and elongation. In many instances, and particularly where the terminal organic portion of the carbamate group is substituted by halogen, nitrile or nitro radicals, the novel plasticizers are also non-bleeding or non-migratory. Moreover, the presence of the substituted radicals, especially the nitro radicals, improves their weather resistance. These plasticizers are readily prepared by novel methods including reacting a monoisocyanate, or a combination of monoisocyanates and di- or polyisocyanates with a polyester or mixture thereof. After the plasticizer has been prepared, it can be compounded quite easily on a rubber mill, in a Banbury, or in other mixing apparatus with the polyurethane.

The resulting plasticized polyurethane can then be sheeted out, extruded, molded, cross-linked and the like depending on whether the polyurethane is of the thermoplastic or thermosetting type, or contains additional cross-linkers and the like.

Polyesters (polyester glycols) used in making the plasticizers of this invention are prepared, for example, by an esterification reaction of a polybasic acid or an anhydride thereof with a glycol, by transesterification and by other well-known methods. Polyesteramides may, also, be used and are essentially polyesters. The polyesteramides are prepared by the condensation of polybasic acid with a mixture of a glycol, an amino hydroxy compound and/or a diamine. In the case of the amino hydroxy compound or diamine the latter two ingredients are present in the reaction mixture in an amount less than one-half the amount of glycol employed so that the major portion of the linkages in the polymer chain are ester linkages with a minor proportion of amide linkages being present.

In preparing these plasticizers it is essential that polyesters which are at least substantially or essentially hydroxyl-terminated be used. Such materials are obtained by reacting an excess of a glycol with a dibasic acid or anhydride thereof which is preferably an aliphatic dibasic acid.

For example, the reactants, such as an excess of ethylene glycol and adipic acid, are reacted together by heating, preferably at about 190° C. at atmospheric pressure for several hours, and then while slow heating is continued the pressure is reduced over another several hour period. During the initial heating period substantially all of the water of esterification and excess reactants are removed and this may be facilitated by passing dry nitrogen through the molten mass. Polyesters of average molecular weights of about 400 to 2000 are obtained in this way. By continuing the evacuation and heating the batch at higher temperatures polyesters of average molecular weights as high as 5000 to 10,000 may be obtained.

The polyester utilized includes polyesters prepared from the esterification of such polybasic acids as the dicarboxylic acids including malonic, succinic, glutaric, adipic, pimelic, sebacic, isosebacic, suberic, azelaic, maleic and the like. Aromatic polybasic acids may also be used alone or included in the mixture with the aliphatic dibasic acids, for example, phthalic acid or hexahydrophthalic acid. Anhydrides of the acids and mixtures of acids and anhydrides also may be used.

Among the polyhydroxy compounds used in preparing the polyesters are preferably glycols, including ethylene glycol, 1,3-butanediol, 1,4-butanediol, pentamethylene glycol, hexamethylene glycol, 1,2-propanediol, 1,3-propanediol, 1,2-butanediol, 2-methyl butanediol-1,4, heptamethylene glycol, octamethylene glycol and the like; polyalkylene glycols such as diethylene glycol and triethylene glycol; and polyhydroxy materials such as glycerin, pentaerythritol, hexane triol, sucrose and the like. Mixtures of glycols may be employed including other polyfunctional hydroxyl materials.

Amino alcohols such as ethanolamine, 3-amino propanol, 4-amino butanol, 6-amino hexanol and the like and/or diamines such as ethylene diamine, propane-1,3-diamine, hexamethylene-1,6-diamine and the like may be employed in preparing the polyesteramides.

Usually preferred for making such materials are the essentially linear, essentially hydroxyl terminated polyesters prepared, for example, from glycols and aliphatic dicarboxylic acids. In general, the glycol employed is an aliphatic glycol containing from 2 to 10 carbon atoms of the formula HO—R—OH wherein R contains from 2 to 10 carbon atoms. The most useful aliphatic dibasic acids are those containing from 4 to 10 carbon atoms of formula HOOC—R—COOH wherein R is an alkylene radical containing from 2 to 8 carbon atoms. The molecular weights of the polyesters may vary from about 200 to 10,000 and more preferably are from about 250 to about 2500. Although the above-described polyesters are ordinarily employed for making the plasticizers, the polyesteramides also are often useful and are prepared from bifunctional amine-containing materials as described above. Preferably the amount of bi-functional amine-containing materials employed is an amount less than 25% equivalent based on the amount of glycol reacted and preferably the amount used is less than 15% equivalent so that the polyesteramide has less than 25% amide linkages and more than 75% ester linkages in the polymer chains, and correspondingly a similar ratio of terminal groups so that the polyesteramide has a major amount of terminal hydroxyl groups. The polyesteramide reaction products are considered to be essentially polyesters.

Still other polyesters may be employed including the natural and synthetic polyesters having 2 or more terminal hydroxyl groups such as the esters formed by reacting ricinoleic acid with glycol, glycerol and the like, mixtures of 2 equivalents of ricinoleic acid and 1 equivalent of stearyl and/or oleic acid with glycerin, alkyd resins and the like.

The preferred polyesters are substantially di-dimensional or linear from the reaction of dibasic acids and glycols and contain only ester linkages and essentially only hydroxyl chain endings.

Instead of using individual polyesters in the reaction with the isocyanates to make the plasticizer, mixtures or blends of polyesters, may be employed.

The isocyanates used in making the novel plasticizers of the present invention are aliphatic, aromatic and cyclic monoisocyanates such as ethyl isocyanate, butyl isocyanate, isobutyl isocyanate, amyl isocyanate, hexyl isocyanate, 1,3-butadiene-2-isocyanate cyclohexyl isocyanate, cyclohexyl phenylene isocyanate, ethyl cyclohexyl isocyanate, dimethyl cyclohexyl isocyanate, phenyl isocyanate, o-tolyl isocyanate, naphthyl isocyanate, phenyl methyl phenylene isocyanate, phenyl ethylene isocyanate, and phenyl phenylene isocyanate. Still other organic monoisocyanates as described above may be utilized in the preparation of the plasticizers. Preferred monoisocyanates are the aromatic monoisocyanates. Mixtures of the various monoisocyanates can be used.

It, also, has been found highly desirable to have nucleophilic or electron withdrawing groups on the organic carbamate terminated polyester. Such materials reduce or prevent bleeding of some types of the present plasticizers and in certain cases greatly improve aging or weathering. They, also, improve the tensile strength, modulus and elongation. While some of these groups on the plasticizer produce hard or brittle materials, the plasticizers themselves will melt or soften; and when these plasticizers are milled and incorporated into the polyurethane, they will plasticize the polyurethane. Examples of such groups are chlorine, bromine, fluorine, iodine, nitrile and nitro radicals. These materials can be formed directly in the plasticizer by reacting a substituted monoisocyanate with the polyester, polyether and the like. Examples of useful organic substituted monoisocyanates are chlorobutyl isocyanate, cyano amyl isocyanate, chloroheptyl isocyanate, iodo-octyl isocyanate, nitropropyl isocyanate, nitro phenylene isocyanate, bromocyclohexyl isocyanate, fluoro methyl phenyl isocyanate, nitro naphthylene isocyanate and the like.

Moreover, while these groups can be substituted anywhere on the organic portion of the organic carbamate terminal group, it has been found that better results are obtained if there are at least 2 or 3 carbon atoms separating the carbamate group and the chloro, nitro and the like groups. For example, with a plasticizer obtained from the reaction of a nitro substituted phenylene isocyanate and a polyester, the meta- and para-substituted isocyanates,

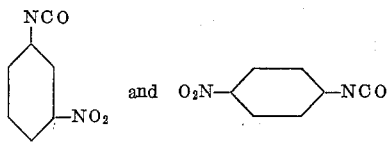

provide plasticizers with better weathering properties than the ortho-substituted isocyanate.

The improved results obtained with the latter type (meta- or para-, for example) of substitution may be due to a tendency of the substituted group to undergo intermolecular association (hydrogen bonding) with the urethane (carbamate) bridges in the chains of the polyurethane. On the other hand, where the substituted group is close to (ortho, for example) or adjacent the carbamate group of the plasticizer it may be that the substituted group joins in intramolecular association with the carbamate (terminal) group of the plasticizer.

The monoisocyanate is used in an amount necessary to react with terminal OH groups of the polyester so that there is obtained an organic carbamate terminated polyester. For example, where the polyester has 2 OH groups at the end of the chain, there should be used at least 2 equivalents of the monoisocyanate:

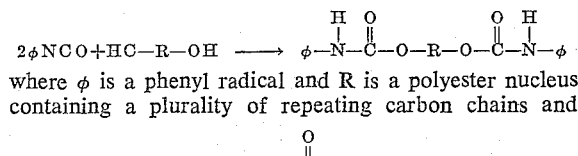

where $\phi$ is a phenyl radical and R is a polyester nucleus containing a plurality of repeating carbon chains and

groups. Where tri- or polyfunctional polyesters are involved which will give tridimensional or polydimensional networks, larger equivalents of the monoisocyanate will be required.

There should be at least one organic carbamate group on the polymeric plasticizer and preferably all of the OH groups should be reacted with monoisocyanates so that the polymeric plasticizer is chain terminated in organic carbamate groups. However, as shown in the accompanying examples it is possible to still obtain useful plasticizers when the polyester still contains a number of unreacted hydroxyl groups.

The molecular weights of the polyesters shown above are average molecular weights and, thus, the polyesters may contain polymers of different chain length. Moreover, depending on the degree of reaction there may be more or less COOH termination. However, as pointed out above, the esterification reaction should be carried out in a manner to insure that the polyester contains a major amount of terminal OH groups or is essentially all OH terminated, it being recognized that it is extremely difficult to obtain a polyester absolutely free of COOH termination. Thus, in the polymeric plasticizer the total amount of organic carbamate termination will be greater than the amount of organic amide

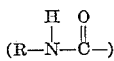

termination.

Likewise, where minor amounts of amines or amino alcohols were present in the polyester reaction mixture, the resulting plasticizer will contain organic substituted urea

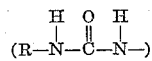

termination but in a minor amount as compared to the organic carbamate

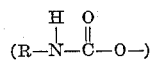

termination.

An alternative method for making the plasticizers of the present invention is to react the polyester with less than the amount of monoisocyanate required and then to react the polyester, blocked at one end with a carbamate group, with a di- or polyisocyanate to chain extend the polyester and provide more urethane and carbamate groups. For example, using a dihydroxy polyester, a monoisocyanate and a diisocyanate, the reaction proceeds as follows:

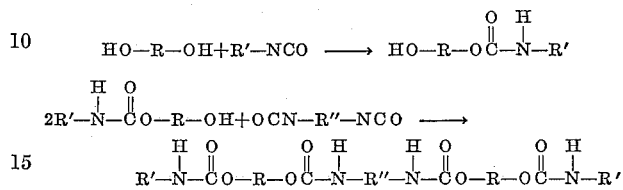

where R is a polyester residue, R' is alkyl and R'' is alkylene.

Another method is to react the polyester with an insufficient amount of di- or polyisocyanate so that there is obtained a chain extended polyester having internal carbamate or urethane groups and terminal hydroxyl groups. These terminal hydroxyl groups can then be reacted with monoisocyanates to provide terminal organic carbamate groups.

Still another method of preparing the plasticizers is to react the polyester with polyisocyanates or mixtures of mono- and polyisocyanates so as to obtain a material which is isocyanate terminated or partially isocyanate terminated and partially carbamate terminated and which contains carbamate linkages. Monohydroxy compounds such as alcohols and the like or compounds having reactive OH groups or a major amount of reactive OH groups and COOH and/or NH$_2$ groups may then be reacted with the isocyanate end groups to provide the desired carbamate termination. By means of catalyst and the like such intermediates can be reacted with polyurethanes through their labile hydrogen atoms on the

groups.

The di- or polyisocyanates which can be employed in the above referred to alternative methods for making the valuable intermediates and end products can be any of the di- or polyisocyanates well known in the art for reacting with polyesters. Examples of useful materials are hexamethylene diisocyanate, phenylene diisocyanate, diphenylmethane diisocyanate, naphthylene diisocyanate, tolylene diisocyanate, dicyclohexyl methane diisocyanate, di-p-xylyl methane diisocyanate, diphenylene diisocyanate, cyclohexyl phenyl diisocyanate and the like. Mixtures of these polyisocyanates can be used.

These novel plasticizers or plasticizer forming materials contain at least one organic carbamate end group. Preferably, they contain a substantial number of organic carbamate end groups and even more preferably are essentially or entirely terminated with organic carbamate end groups. These materials may also desirably contain a number of carbamate linkages. The ratio of the total number of carbamate end groups and carbamate linkages to the average molecular weight of the polyester initially employed will vary from about 1:50 to 1:7,500, preferably the ratio will vary from about 1:100 to 1:1,000 to obtain the best combination of chemical and physical properties.

The polyurethanes plasticized by the plasticizers of this invention may be any polyester urethanes or mixtures or blends thereof. These materials are well known as shown above in the second paragraph through the seventh paragraph as well as other polyurethanes known to the art. The novel plasticizers are used in an amount necessary to achieve the desired plasticization and physical properties and their selection will depend on the type of polyurethane employed, i.e., from what components it was made, the number and spacing of the carbamate or urethane, and ester linkages and on the type of presently disclosed plasticizer, i.e., the number of carbamate groups, ester linkages, spacing and similar factors. In general, however, the amounts may vary from about 5 to 100 parts by weight of the plasticizer to 100 parts of the polyurethane. Preferably, the amounts will vary from about 10 to 80 parts by weight of the plasticizer to 100 parts by weight of the polyurethane. Mixtures of plasticizers can be used to plasticize a polyurethane or a blend of polyurethanes.

If the reaction between the polyester and the isocyanate is too fast or erratic, it may be desirable to purify the polymers by washing with water, or by treatment with ion exchange resins or inorganic absorbents and then removing the purifying agents. The isocyanates can usually be purified by distillation or recrystallization. The speed of the reaction can then be increased by adding catalysts as is well known to the art.

The plasticized polyurethanes of the present invention can also contain fillers such as silica and calcium silicate, titanium dioxide, carbon black, color pigments and dyes, mica, metallic flakes, antidegradants (antiozanants, antioxidants, etc.), fungicides, germicides, resins, rubbers, oils and other compounding materials well known to the art.

Polyurethanes plasticized with the plasticizers of the present invention exhibit a marked reduction in hardness and a great improvement in their ability to be extruded. Extrusions of these plasticized polyurethanes can be effected at lower temperatures to give smooth and even surfaces. Polyurethanes containing these plasticizers can also be milled more readily. Moreover the plasticizers of the present invention improve the tensile strength, modules and elongation of the polyurethane and in certain cases greatly improve the weather resistance of the polyurethane. Many of the novel plasticizers are non-bleeding, particularly if they contain nuclophilic substituents on the terminal carbamate groups.

The plasticized polyurethanes of the present invention can be used in any application where a plasticized polyurethane is indicated. Examples of materials which may be made utilizing these plasticized polyurethanes are printing rolls, industrial truck tires, automobile and truck tire treads, flexible shoe heels and soles, flexible electrical wire jacketing, hose, tubing, conveyor belts, tank linings, molded goods and the like. These plasticized polyurethanes can be cast or calendered onto fabrics of cotton, wool, glass, nylon, Dacron, rayon and the like and mixtures thereof to make fabrics useful in the manufacture of tents, awnings, tarpaulins, protective coatings such as rain wear, pressure sensitive adhesive tapes and so forth.

The following examples will serve to illustrate the present invention with more particularity to those skilled in the art:

EXAMPLE I 98.4 g. (0.1 mole of polyester or 0.2 mole equavalent of OH groups) of essentially hydroxyl terminated polytetramethylene adipate of molecular weight 984 was dried under a vacuum of 5 mm. at 120° C. for a period of 30 minutes. To the dried ester about 23.80 g. (0.20 mole of the compound or 0.2 equivalent of NCO groups) of phenyl isocyanate was added. The mixture was heated and stirred for four hours. At the end of this time the resulting phenyl carbamate-terminated polyester (poly tetramethylene adipyl phenyl carbamate) was heated under vacuum (5 mm./150° C.) for a short period of time to remove any unreacted isocyanate. The reaction is believed to proceed as follows:

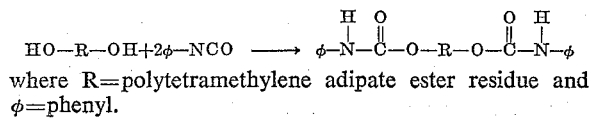

where R=polytetramethylene adipate ester residue and φ=phenyl.

50 g. of a hard (Shore D hardness—about 90), tough polyurethane, 1.7 moles metaphenylene diisocyanate, and 0.7 mole of neopentyl glycol and 1 mode of OH-terminated polyneopentylene isophthalate (molecular weight of about 800) were milled on a laboratory size 2-roll rubber mill at a temperature of 330° F. To the polyesterurethane 20 g. of the phenyl carbamate-terminated polyester was added in slow increments. As the plasticizer was added, it was found possible to reduce the temperature until finally the polyurethane blend could be milled cold (room temperature or 75° F.). The plasticized polyurethane was then stripped from the mill and molded at 100° C. The sheet which was obtained was clear and flexible and had a Shore D durometer hardness of 35. After standing for 3 days at room temperature no bleeding of the phenyl carbamate-terminated polyester from the polyurethane sheet was observed and the sheet remained completely plasticized. The phenyl carbamate-terminated polyester was apparently completely compatible with the polyurethane.

When the milling procedure was repeated except that an additional 20 grams of the same carbamate-terminated polyester plasticizer were added to the polyesterurethane, a very tacky, soft sheet was obtained which was difficult to remove from the mill and which was heat and pressure sensitive.

EXAMPLE II

A number of different hydroxyl-terminated polyesters were reacted with phenyl isocyanate and other isocyanates to make phenyl carbamate-terminated polymers as follows:

(a) 984.0 g. of hydroxyl-terminated polytetramethylene adipate (984—M.W.) were placed in a resin pot having a stirrer, heated to 100° C. and dried at a pressure of 5 mm. Then, 238 g. (2 moles) of phenyl isocyanate were added in increments of 10 ml. at 5 minute intervals. The temperature (thermocouple) increased from 100° to 130° C., a value which remained constant, ±5° C. Heating was continued for 1 hour after which any unreacted isocyanate was stripped off by treatment under a vacuum (125° C./2 mm.). The resulting product was essentially polytetramethylene adipyl diphenylcarbamate.

(b) 97.8 g. of polyethylene isosebacate (M.W.—978), dried under a vacuum at 100° C./5.0 mm., were reacted with 23.8 g. (0.2 mole) of phenyl isocyanate for 1 hour. A temperature rise of +30° C. was noted. The resulting material was treated at 120° C./2.0 mm. to remove any excess isocyanate. A quantitative yield of an amber oil of polyethylene isosebacyl diphenylcarbamate was obtained.

(c) 94.2 g. (0.10 mole) of polypropylene glycol (M.W.—942) were dried at 120° C. and 2 mm. for 40 minutes. Next, 23.8 g. (0.20 mole) of phenyl isocyanate were added, and stirring was continued for 20 minutes. The resulting phenyl carbamate-terminated polyethylene glycol was heated under a vacuum (120° C./2.0 mm.) to remove any excess isocyanate. The product was a thinly viscous, amber-colored oil.

(d) 83.2 g. (0.05 mole) hydroxyl-terminated neopentyl glycol-adipic acid polyester (M.W.—1664) (polyneopentyl adipate) were dried at 120° C. and 2.0 mm. for 40 minutes in a stirred reactor. 11.90 g. (0.10 mole) of phenyl isocyanate were added and heating and stirring were continued for 20 minutes. After treatment under a vacuum to remove any excess isocyanate, a viscous, amber-colored liquid, the diphenyl carbamate of neopentyl glycol adipate, was obtained.

(e) 92.8 g. (0.1 mole) of hydroxyl terminated polytetramethylene hexahydrophthalate (M.W.—928) were dried in a stirred tube reactor at 120° C. and 2.0 mm. After the vacuum was released, 23.80 g. (0.2 mole) of phenyl isocyanate were added and the mixture was stirred and heated for 20 minutes. A vacuum was finally applied to remove any excess isocyanate and the product obtained was a yellow viscous oil, diphenyl carbamate-terminated polytetramethylene hexahydrophthalate.

(f) 98.4 g. (0.1 mole) of hydroxyl terminated polytetramethylene adipate (M.W.—984) were dried at 120° C./5 mm. for 40 minutes in a stirred tube reactor. 11.90 g. (0.10 mole) of phenyl isocyanate were added to the dried polyester and the reaction was allowed to continue for 40 minutes with constant stirring. To the resulting material there was added 0.05 mole (8.20 g.) of m-phenylene diisocyanate and stirring was continued for another 40 minutes at 150° C. The reactions involved are believed to be as follows:

and

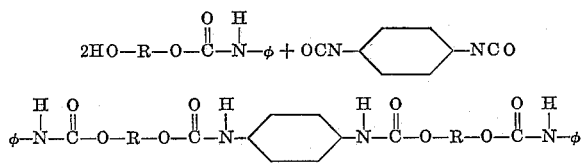

10 grams of each of the above phenyl carbamate-terminated polymers of Example II were then compounded with 50 grams of a polyesterurethane prepared from 1 mole of polytetramethylene adipate (PTMA), M.W.—1000, 2 moles of diphenylmethane-p,p'-diisocyanate (DPMppDI) and 1 mole of butanediol-1,4 (BD 1-4). They were blended together on a 2 roll rubber mill at 300° F. After blending or mixing, the compositions were stripped from the rolls and molded at 120° C. The appearance of the blends and the results obtained on testing them are shown in Table A below where RT signifies room temperature, w./o. weathering signifies without weathering:

small amount (.1 g.) of piperazine as a catalyst. After stirring for 2 hours, a vacuum was applied to remove the piperazine and any excess phenyl isocyanate. The resulting material was hard and tough.

10 g. of this material were then compounded on a 2-roll rubber mill at 300° F. with 50 grams of the same type of polyesterurethane (from polytetramethylene adipate, diphenyl methane-p,p'-diisocyanate and butanediol-1,4) as shown in Example II, above. After the compounded stock was molded at 125° C. the following results were obtained:

*Table B*

Appearance _____ Slightly opaque, no residual tack.
Shore A hardness _____ 92.
Dynamic extrusion $T_2$ _____ 84° C.
Graves angle tear (RT) _____ 45 lbs./0.1".
Stress-strain properties (RT, w./o. weathering ⅛"):
   Tensile strength _____ 6400 p.s.i.
   300% modulus _____ 2600 p.s.i.
   Percent elongation _____ 850.

EXAMPLE IV 133.2 g. of polyetramethylene adipate (M.W. about 2665) were dried in a stirred tube reactor at 120° C./3 mm. Hg for a period of one hour to remove water. 12.5 g. of phenyl isocyanate and 0.2 g. of piperazine (as a catalyst) were added to the polyester and the mixture was stirred for 2 hours at 120° C. following which a vacuum was applied over a period of 2 hours to remove any excess isocyanate and piperazine. The resulting material was hard and brittle.

10 g. of this material were then mixed with 50 grams of the same polyesterurethane shown in Example II, above,

*Table A.—Properties of polyesterurethane-phenyl carbamate terminated plasticizer compositions*

| Composition | | Appearance | Shore A Durometer hardness | Dynamic extrusion, $T_2$,° C. | Graves angle tear (RT), lb./0.1" | Stress-strain(RT), ⅛" sample (w./o. weathering) | | |
|---|---|---|---|---|---|---|---|---|
| Polyurethane, 50 gms. | Plasticizer, 10 gms. | | | | | Tensile, p.s.i. | 300% modulus, p.s.i. | Elong., percent |
| PTMA, BD1-4 DPMppDI (Control). | | | 90 | 113.5 | 46 | 6,900 | 1,000 | 660 |
| Do | IIa | Clear transparent, compatible, nonsticky. | 70 | 85 | 37.5 | 7,200 | 1,700 | 820 |
| Do | IIb | ___do___ | 70 | 75 | 32.5 | 5,700 | 1,700 | 730 |
| Do | IIc | Opaque, slick surface | 67 | 72 | 37.5 | 7,400 | 1,900 | 690 |
| Do | IId | Opaque slightly sticky surface. | 72 | 92 | 37.5 | 9,100 | 1,900 | 680 |
| Do | IIe | Clear, transparent, nonsticky. | 72 | 90 | 39.0 | 7,900 | 1,800 | 760 |
| Do | IIf | ___do___ | 67 | 84 | 40.0 | 7,100 | 2,000 | 760 |

Normally the addition of a plasticizer (diluent or nonreactive type) to a polymer will result in a material exhibiting lower crystallinity and higher elongation but lower tensile strength. The use of cross-linking plasticizers usually results in products exhibiting lower elongation values but higher tensile strengths. Unexpectedly, applicant's plasticizers provide, in almost all of the above polyesterurethanes, products with not only higher tensile strengths but also higher elongations and higher moduli coupled with lowered hardness and better extrusion properties. The physical properties of applicant's plasticized products, thus, are in marked contrast to those of the art generally.

EXAMPLE III

An excess of phenyl isocyanate was added to polytetramethylene adipate (M.W not above about 10,000), which had been heated at 120° C./3 mm. Hg to remove water in a stirred tube reactor, in the presence of a very on a 2-roll rubber mill at 300° F. The resulting compound was stripped from the mill at 160° F. and molded at 125° C. The molded product was examined and tested and exhibited the following properties:

*Table C*

Appearance _____ Opaque, no residual tack.
Shore A hardness _____ 94.
Dynamic extrusion, $T_2$ _____ 55° C.
Graves angle tear (RT) _____ 38.8 lb./0.1".
Stress-strain properties (RT, w./o. weathering, ⅛"):
   Tensile strength _____ 4400 p.s.i.
   300% modulus _____ 1350 p.s.i.
   Percent elongation _____ 610.

The results of Examples III and IV show that the use of polyesters of high molecular weight in the preparation of plasticizers is not as desirable as the use of low molecular weight polyesters since they do not substantially soften the stocks. However, the examples still show that the use of applicant's plasticizers will plasticize the polyurethane and provide a high tensile, high modulus and high elongation product even though the plasticizers themselves are hard materials.

EXAMPLE V

A polyesterurethane was prepared by the reaction of 1 gram-mol of hydroxyl terminated polytetramethylene adipate (M.W.—1000), 2-gram-mols of diphenyl methane-p,p'-diisocyanate and 1 gram-mol of butanediol-1,4; the molar equivalents of the diisocyanate being equal to the sum of the molar equivalents of the polyester and diol so that there were essentially no OH and/or NCO groups remaining at the end of the reaction.

100 parts by weight of polyesterurethane were milled on a rubber mill at 300–330° F. When the polyesterurethane beaded, 20 parts by weight of di-phenyl carbamate-terminated polytetramethylene adipate (prepared as in Example II(a), above) were added gradually to the polyurethane over a period of 20–30 minutes following which the temperature was reduced to 150° F. and the material sheeted off the mill. The plasticized material was then molded at 140° C. After molding, samples of the plasticized material were tested for their physical properties.

A similar plasticized polyurethane was prepared except that 20 parts by weight of a bis(p-chlorophenyl carbamate) of polytetramethylene adipate were used as the plasticizer in place of the phenyl carbamate-terminated polyester shown in the above paragraph. The resulting plasticized polyurethane exhibited a non-tacky surface.

The chlorinated material, a hard, white gray wax, was prepared by reacting 16.91 g. (0.11 mole) of p-chlorophenyl isocyanate with 50 g. of polytetramethylene adipate (M.W.—984) which had been dried in a stirred tube reactor at 120° C./1.0 mm. for 30 minutes. The adipate and isocyanate were heated and stirred for 30 minutes, following which 0.05 ml. of benzyl trimethyl ammonium hydroxide (as a catalyst) was added and heating continued for another 30 minutes. Finally, a vacuum was applied for a period of 60 minutes to remove any excess isocyanate.

Tests on the above plasticized polyurethanes gave the following results:

The chlorine substituted plasticizer provided polyurethanes which exhibited generally better physical properties than the unsubstituted plasticizer. After storage, samples of the polyurethane containing the chlorine substituted plasticizer were not tacky nor sticky, showing that there had been no bleeding of the plasticizer. This example shows that the use of chlorine substituted phenyl carbamate-terminated polyesters not only improves the physical properties of the plasticized polyurethanes but also provides non-bleeding plasticized polyurethanes or polyurethanes free of plasticizer migration.

EXAMPLE VI 92.8 g. (0.10 mole) of polytetramethylene heaxhydrophthalate, a viscous oil, (M.W.—928) were dried at 120° C./3 mm. Hg for 1 hour in a stirred tube reactor. Vacuum was released and 32.8 g. of p-nitrophenyl isocyanate (0.20 mole) were added together with 0.2 ml. of dry pyridine as a catalyst. Heating and stirring were conducted for 1 hour following which a vacuum was applied to remove any excess isocyanate and pyridine. A yellow-orange, brittle resin, was obtained, di-p-nitrophenyl carbamate of polytetramethylene hexahydrophthalate.

100 parts by weight of a polyesterurethane somewhat similar to that shown in Example V, above, were then milled with 20 parts by weight of the above nitro derivative of the hexahydrophthalate ester on a 2-roll rubber mill at 250° F. The resulting milled mixture was molded at 135° C.

100 parts of the same polyesterurethane were likewise compounded and molded with 20 parts of the phenyl carbamate-terminated hexahydrophthalate ester shown in Example II-e above.

The resulting plasticized polyesterurethanes were examined and tested at room temperature, were tested after aging in the Weatherometer and were examined after storage. The results on tests are shown below:

*Table E*

| Material | Stress-strain properties (micro, RT) | | | | | |
| --- | --- | --- | --- | --- | --- | --- |
| | w./o. Weathering | | | After 1 week in Weatherometer | | |
| | Tensile strength, p.s.i. | 300% modulus, p.s.i. | Elong., percent | Tensile strength, p.s.i. | 300% modulus, p.s.i. | Elong., percent |
| Polyesterurethane+di(-p-nitrophenyl carbamate) of poly-T-H-phthalate as plasticizer | 6,600 | 1,200 | 725 | 2,900 | 1,300 | 550 |
| Polyesterurethane+di(phenyl carbamate) of Poly-T-H-phthalate as plasticizer | 5,800 | 1,200 | 710 | 800 | | 100 |

The above results show that the use of nitro substituted phenyl carbamate polyester plasticizer initially confers better physical properties on the polyesterurethane than the unsubstituted phenyl carbamate material and very much better properties after aging as shown by weatherometer tests.

EXAMPLE VII 91.8 g. (0.10 mole) of Paracin 32 (Baker Castor Oil Co.) were placed in a stirred reactor and dried under

*Table D*

| Material | Shore "A" hardness | Dynamic extrusion, T2, ° C. | Graves angle tear, RT, lb./0.1" | Stress-strain properties, RT, w./o. weathering, ⅛" | | |
| --- | --- | --- | --- | --- | --- | --- |
| | | | | Tensile strength, p.s.i. | 300% Modulus, p.s.i. | Elongation, percent |
| Polyester-urethane+bis-phenyl carbamate-term. polyester as plasticizer | 80 | 107 | 40 | 4,600 | 1,350 | 650 |
| Polyester-urethane+bischlorophenyl carbamate-term. polyester as plasticizer | 80 | 104 | 40 | 5,050 | 1,250 | 680 |

13 vacuum (120° C./1.2 mm. Hg) for 40 minutes. Paracin 32 has a molecular weight of about 918 and is a diricinoleyl stearate glyceride (a triester) having two OH groups.

11.90 g. (0.1 mole) of phenyl isocyanate were added to the dried Paracin with heating and stirring being maintained for 20 minutes. Following this, 16 g. (0.1 mole) of p-phenylene diisocyanate were added, heating was continued for a period of 40 minutes and then a vacuum was applied to remove any excess reagent. Finally 9.20 g. (0.1 mole) of glycerol was added to the reaction mixture to obtain a sticky, soft, polymeric material. The reaction which occurred is believed to be as follows:

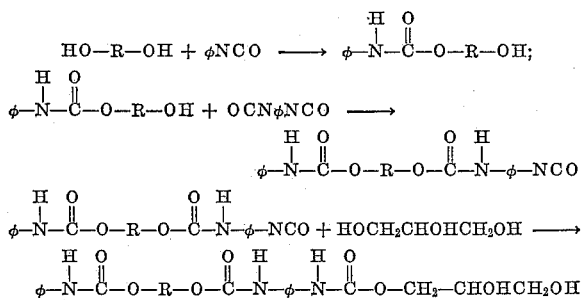

In addition to the above some side reactions may occur so that a portion of the glyceride or polyester is entirely phenyl carbamate-terminated, and some reaction may occur between the unsaturated groups of the recinoleic component and the like.

5 g. of the above soft polymeric material were then mixed with 100 g. of a polyesterurethane, the same as that shown in Example V, above, on a 2-roll rubber mill at 220–250° F. and the resulting compound was molded at 140° C. The plasticized material exhibited no tendency to bleed and had a very smooth feel. Tests were made on the plasticized polyesterurethane and on the unplasticized polyesterurethane and the results obtained are shown below:

Table F

| Material | Shore "A" hardness | Dynamic extrusion, $T_2$, ° C. | Graves angle tear, RT, lb./0.1" | Stress-strain properties, RT, w./o. weathering; micro | | |
|---|---|---|---|---|---|---|
| | | | | Tensile strength, p.s.i. | 300% modulus, p.s.i. | Percent elongation |
| Polyesterurethane (unplasticized) | 90 | 142 | 45 | 8,450 | 1,350 | 575 |
| Polyesterurethane (plasticized with isocyanate and glycerol treated Paracin 32) | 85 | 131 | 43 | 8,300 | 1,600 | 600 |

This example shows that polyester plasticizers containing terminal phenyl carbamate groups, urethane linkages and free hydroxyl groups are compatible with polyesterurethanes and will provide softer stocks having better extruding properties with retention of substantially all of or an improvement in the original physical properties of the polyesterurethane.

14

EXAMPLE VIII 46.4 g. (0.05 mole) of hydroxyl-terminated polytetramethylene hexahydrophthalate (M.W.—about 928) were dried in a stirred tube reactor at 100° C./2.0 mm. The vacuum was released and 16.41 g. (0.10 mole) of ortho-nitrophenyl isocyanate were added. The mixture was stirred for a further 20 minutes, and a vacuum was applied to remove any excess isocyanate. The resulting di-o-nitrophenyl carbamate terminated polytetramethylene hexahydrophthalate was a yellow, opaque, hard, brittle low melting material.

The same procedure was followed except that meta-nitrophenyl isocyanate was used in place of the ortho-nitrophenyl isocyanate to obtain a di-meta-nitrophenyl carbamate terminated polytetramethylene hexahydrophthalate which was a dark-brown, brittle, low melting polymer.

20 g. each of the above ortho and meta-nitro-derivatives as well as the para-nitro derivative (prepared as shown in Example VI, above) were mixed with 100 grams of a polyesterurethane, the same type as in Example V, above, on a rubber mill and molded. Tests of the plasticized compounds gave the following results:

Table G

| Material | Shore "A" hardness | Dynamic extrusion, $T_2$, ° C. | Stress-Strain properties RT, w./o. weathering, micro | | |
|---|---|---|---|---|---|
| | | | Tensile strength, p.s.i. | 300% modulus, p.s.i. | Percent elongation |
| Polyester-urethane+ ortho-nitro derivative of PTMHHP | 75 | 99 | 5,400 *1,350 | 1,400 *1,100 | 825 *425 |
| Polyester-urethane+ meta-nitro derivative of PTMHHP | 76 | 117 | 6,400 *2,200 | 1,400 *1,200 | 725 *600 |
| Polyester-urethane+para-nitro derivative of PTMHHP | 76 | 115 | 7,000 *1,600 | 1,500 *1,150 | 650 *500 |

* After 1 week in the Weatherometer.

The above results show that it is preferable to have the nitro group in meta or para position to afford the best stress-strain properties before and after weathering.

EXAMPLE IX 100 g. of a polyesterurethane having a Shore D hardness of about 90 and similar to that of Example I, above, were milled on a 2-roll rubber mill at 330° F. When the mass banded on the mill, 40 g. of the same type of plasticizer (polyethylene isosebacyl diphenyl carbamate) as shown in Example II(b), above, were added in small increments. The temperature was reduced from 330° F. to 200° F. and the plasticized polyurethane was stripped off the mill and molded between Teflon sheets at 150° C. The resultant molded and plasticized polyesterurethane was tough, pliable, transparent, and homogeneous and had a Shore D durometer hardness of 80.

100 g. of the same polyesterurethane were milled at 300° F. on a 2-roll rubber mill to form a band and 80 g. of the same phenyl carbamate polyester were added. The roll temperature was reduced to 220° F. and the material was stripped off the mill and molded at 80° C. The resulting product was a clear, amber-colored plastic sheet having a Shore D durometer hardness of about 30.

This example illustrates that large amounts of plasticizer will still afford satisfactory results and that a phenyl carbamate terminated polyester can be employed with a neopenthylene isophthalate containing polyesterurethane.

In summary, the present invention teaches that organic carbamate-terminated polyesters will serve to plasticize polyurethanes resulting in plasticized polymers which are softer, have improved extruding properties and which in many cases have better tensile strengths, moduli and elongations over unplasticized polyurethanes. Moreover, many of these plasticizers are non-migratory, and, particularly where the organic carbamate group contains nucleophilic groups, they are not only non-migratory but afford polyurethanes having excellent weather resistance as compared to unplasticized polyurethanes. Furthermore, polyurethanes containing untreated polyesters and the like do not exhibit the same combination of improved properties as exhibited by polyurethanes having terminal carbamate groups. This shows that having at least one or a majority of terminal carbamate groups on the polyesters is necessary and critical to obtain the new and unexpected results disclosed herein.

Having thus described the invention what is claimed as patentably new is:

1. A polymeric compound consisting of a polyester made by an esterification reaction of a member of the group consisting of dicarboxylic acids and anhydrides thereof with a glycol having terminal groups consisting essentially of aromatic carbamate groups of the formula

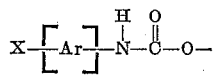

where Ar is an aromatic nucleus and where X is selected from the class consisting of fluorine, chlorine, bromine, iodine, nitrile and nitro radicals, and the average molecular weight of the individual polyester of said polymeric compound being from about 250 to 2500.

2. A polymeric compound consisting of a polyester made by an esterification reaction of a member of the group consisting of dicarboxylic acids and anhydrides thereof with a glycol having essentially terminal groups of the formula

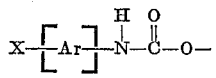

where Ar is an aromatic nucleus and where X is selected from the class consisting of fluorine, chlorine, bromine, iodine, nitrile and nitro radicals, the position of X being selected from the positions meta and para with respect to the

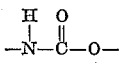

portion of said

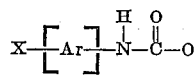

terminal group and the average molecular weight of the individual polyester portions of said polymeric compound being from about 250 to 2500.

3. A polymeric compound consisting of a polyester made by an esterification reaction of a member of the group consisting of dicarboxylic acids and anhydrides thereof with a glycol having terminal groups consisting essentially of aromatic carbamate groups of the formula

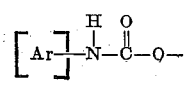

where Ar is an aromatic nucleus, and having at least one

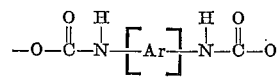

group, where Ar is an aromatic nucleus, linking individual portions of said polyester of said polymeric compound, the average molecular weight of the individual polyester portions of said polymeric compound being from about 250 to 2500 and the ratio of the total number of carbamate radicals in said terminal and linking groups to said average molecular weight being from about 1:100 to 1:1000.

4. A composition comprising a hard, tough polyesterurethane and at least one polymeric compound consisting of a polyester made by an esterification reaction of a member of the group consisting of dicarboxylic acids and anhydrides thereof with a glycol, said polymeric compound having at least one terminal organic carbamate group of the formula

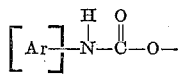

where Ar is an aromatic nucleus and being present in an amount sufficient to plasticize said hard, tough polyesterurethane.

5. A composition comprising a hard, tough polyesterurethane and at least one polymeric compound consisting of a polyester made by an esterification reaction of a member of the group consisting of dicarboxylic acids and anhydrides thereof with a glycol, said polymeric compound having a predominant amount of terminal organic carbamate groups of the formula

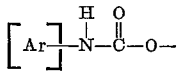

where Ar is an aromatic nucleus and being present in an amount sufficient to plasticize said hard, tough polyesterurethane.

6. A composition comprising a hard, tough polyesterurethane and at least one polymeric compound consisting of a polyester made by an esterification reaction of a member of the group consisting of dicarboxylic acids and anhydrides thereof with a glycol, said polymeric compound having terminal groups consisting essentially of organic carbamate groups of the formula

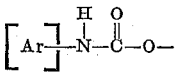

where Ar is an aromatic nucleus and being present in an amount sufficient to plasticize said hard, tough polyesterurethane.

7. A composition comprising a hard, tough polyesterurethane and at least one polymeric compound consisting of a polyester made by an esterification reaction of a member of the group consisting of dicarboxylic acids and anhydrides thereof with a glycol, said polymeric compound having terminal groups consisting essentially of aromatic carbamate groups of the formula

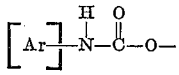

where Ar is an aromatic nucleus and being present in an amount sufficient to plasticize said hard, tough polyesterurethane.

8. A composition comprising a hard, tough polyesterurethane and at least one polymeric compound consisting of a polyester made by an esterification reaction of a member of the group consisting of dicarboxylic acids and anhydrides thereof with a glycol, said polymeric compound having terminal groups consisting essentially of aromatic carbamate groups of the formula

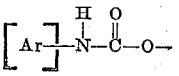

where Ar is an aromatic nucleus, the average molecular weight of the individual polyester portions of said polymeric compound being from about 250 to 2500, and said polymeric compound being present in an amount sufficient to plasticize said hard, tough polyesterurethane.

9. A composition of matter comprising a hard, tough polyesterurethane and at least one polymeric compound consisting of a polyester made by an esterification reaction of a member selected from the group consisting of dicarboxylic acids and anhydrides thereof with a glycol, said polymeric compound having terminal groups consisting essentially of aromatic carbamate groups of the formula $$X\text{---}[Ar]\text{---}\underset{\underset{H}{|}}{N}\text{---}\underset{\underset{O}{\|}}{C}\text{---}O\text{---}$$

where Ar is an aromatic nucleus and where X is selected from the class consisting of fluorine, chlorine, bromine, iodine, nitrile and nitro radicals, the average molecular weight of the individual polyester of said polymeric compound being from about 250 to 2500, and said polymeric compound being present in an amount sufficient to plasticize said polyesterurethane.

10. A composition of matter comprising a hard, tough polyesterurethane and at least one polymeric compound consisting of a polyester made by an esterification reaction of a member of the group consisting of dicarboxylic acids and anhydrides thereof with a glycol, said polymeric compound having essentially terminal groups of the formula $$X\text{---}[Ar]\text{---}\underset{\underset{H}{|}}{N}\text{---}\underset{\underset{O}{\|}}{C}\text{---}O\text{---}$$

where Ar is an aromatic nucleus and where X is selected from the class consisting of fluorine, chlorine, bromine, iodine, nitrile and nitro radicals, the position of X being selected from the positions meta and para with respect to the $$\text{---}\underset{\underset{H}{|}}{N}\text{---}\underset{\underset{O}{\|}}{C}\text{---}O\text{---}$$

portion of said $$X\text{---}[Ar]\text{---}\underset{\underset{H}{|}}{N}\text{---}\underset{\underset{O}{\|}}{C}\text{---}O\text{---}$$

terminal group of said polymeric compound, the average molecular weight of the individual polyester portions of said polymeric compound being from about 250 to 2500, and said polymeric compound being present in an amount of from about 5 to 100 parts by weight per 100 parts by weight of said hard, tough polyesterurethane.

11. A composition of matter comprising a hard, tough polyesterurethane and at least one polymeric compound consisting of a polyester made by an esterification reaction of a member of the group consisting of dicarboxylic acids and anhydrides thereof with a glycol, said polymeric compound having terminal groups consisting essentially of aromatic carbamate groups of the formula $$[Ar]\text{---}\underset{\underset{H}{|}}{N}\text{---}\underset{\underset{O}{\|}}{C}\text{---}O\text{---}$$

where Ar is an aromatic nucleus and having at least one $$\text{---}O\text{---}\underset{\underset{O}{\|}}{C}\text{---}\underset{\underset{H}{|}}{N}\text{---}[Ar]\text{---}\underset{\underset{H}{|}}{N}\text{---}\underset{\underset{O}{\|}}{C}\text{---}O\text{---}$$

group, where Ar is an aromatic nucleus linking individual polyester portions of said polymeric compound, the average molecular weight of the individual polyester portions of said polymeric compound being from about 250 to 2500, the ratio of the total number of carbamate radicals in said terminal and linking groups to said average molecular weight of each of said portions being from about 1:100 to 1:1000, and said polymeric compound being present in an amount of from about 10 to 80 parts by weight per 100 parts by weight of said hard, tough polyesterurethane.

12. The method which comprises reacting a polymer terminated essentially in hydroxyl groups and selected from the class consisting of polyesters made by an esterification reaction of a member of the group consisting of dicarboxylic acids and anhydrides thereof with a glycol with an organic monoisocyanate in an amount sufficient to react with all of said hydroxyl groups.

13. The method which comprises reacting an essentially hydroxyl terminated polymer consisting of a polyester made by an esterification reaction of a member of the group consisting of dicarboxylic acids and anhydrides thereof with a glycol and having an average molecular weight of from about 250 to 2500 with an aromatic monoisocyanate in an amount sufficient to react with approximately half of the hydroxyl groups on said polymer in order to provide said polymer with a portion of terminal aromatic carbamate groups of the formula $$[Ar]\text{---}\underset{\underset{H}{|}}{N}\text{---}\underset{\underset{O}{\|}}{C}\text{---}O\text{---}$$

where Ar is an aromatic nucleus and then reacting about 2 equivalents of said monoisocyanate treated polymer with an equivalent of an aromatic diisocyanate to provide a polymer having terminal aromatic carbamate groups of the formula $$[Ar]\text{---}\underset{\underset{H}{|}}{N}\text{---}\underset{\underset{O}{\|}}{C}\text{---}O\text{---}$$

where Ar is an aromatic nucleus and at least one aromatic dicarbamate linkage of the formula $$\text{---}O\text{---}\underset{\underset{O}{\|}}{C}\text{---}\underset{\underset{H}{|}}{N}\text{---}[Ar]\text{---}\underset{\underset{H}{|}}{N}\text{---}\underset{\underset{O}{\|}}{C}\text{---}O\text{---}$$

where Ar is an aromatic nucleus.

14. The method which comprises reacting an essentially hydroxyl terminated polymer consisting of a polyester made by an esterification reaction of a member of the group consisting of dicarboxylic acids and anhydrides thereof with a glycol having an average molecular weight of from about 250 to 2500 with an aromatic monoisocyanate in an amount to react with a portion of the hydroxyl groups on said polymer to provide a polymeric material which is partially hydroxyl terminated and partially aromatic carbamate terminated said aromatic carbamate termination having the formula $$[Ar]\text{---}\underset{\underset{H}{|}}{N}\text{---}\underset{\underset{O}{\|}}{C}\text{---}O\text{---}$$

where Ar is an aromatic nucleus, reacting said polymeric material with a polyisocyanate in an amount sufficient to react with the remaining hydroxyl groups of the polymer and to render said polymeric material carbamate terminated and isocyanate terminated, and then reacting said polyisocyanate treated polymeric material with an organic hydroxyl containing compound in an amount at least sufficient to convert said isocyanate end groups to organic carbamate groups.

15. The method according to claim 12 in which said organic monoisocyanate is an aromatic monoisocyanate.

16. The method according to claim 15 in which said aromatic monoisocyanate has the formula $$X\text{---}[Ar]\text{---}N\text{=}C\text{=}O$$

where Ar is an aromatic nucleus and where X is selected from the group consisting of fluorine, chlorine, bromine, iodine, nitrile, and nitro radicals.

17. The method according to claim 16 in which X is in a position selected from the class consisting of meta and para to the —N=C=O group of said monoisocyanate.

18. The method according to claim 15 in which said polymer has an average molecular weight of from about 250 to 2500.

References Cited by the Examiner

UNITED STATES PATENTS

| | | | |
|---|---|---|---|
| 2,462,042 | 2/49 | Howald et al. | 260—45.4 |
| 2,647,884 | 8/53 | Wystrach | 260—45.4 |
| 2,727,020 | 12/55 | Melamed | 260—45.4 |
| 2,777,831 | 1/57 | Seeger et al. | 260—75 |
| 2,801,990 | 8/57 | Seeger et al. | 260—45.4 |
| 2,852,483 | 9/58 | Mason | 260—75 |
| 2,888,432 | 5/59 | Fauser | 260—45.4 |
| 2,905,582 | 9/59 | Coleman et al. | 260—45.4 |
| 2,907,745 | 10/59 | Greenlee | 260—45.4 |
| 2,939,851 | 6/60 | Orchin | 260—75 |
| 2,948,691 | 8/60 | Windemuth et al. | 260—471 |
| 3,014,894 | 12/61 | Muller et al. | 260—45.4 |

FOREIGN PATENTS 770,289  3/57  Great Britain.

WILLIAM H. SHORT, *Primary Examiner.*

DANIEL ARNOLD, LEON J. BERCOVITZ, *Examiners.*

UNITED STATES PATENT OFFICE
CERTIFICATE OF CORRECTION

Patent No. 3,205,284                                        September 7, 1965

Charles R. McCulloch

It is hereby certified that error appears in the above numbered patent requiring correction and that the said Letters Patent should read as corrected below.

Column 5, lines 27 to 29, for that portion of the formula reading "+HC-" read -- +HO- --; column 8, line 3, for "mode" read -- mole --; column 12, line 14, for "heaxhydro-" read -- hexahydro- --; column 15, line 8, for "neopenthylene" read -- neopentylene --.

Signed and sealed this 31st day of May 1966.

SEAL)

.ttest:

RNEST W. SWIDER                                                EDWARD J. BRENNER esting Officer                                                            Commissioner of Patents